United States Patent Office 3,412,088
Patented Nov. 19, 1968

3,412,088
CINNAMOYLAMINO-ISOTHIAZOLEANTHRONES
Visvanathan Ramanathan, Basel, Switzerland, assignor to Ciba Limited, Basel, Switzerland, a Swiss company
No Drawing. Filed Aug. 12, 1965, Ser. No. 479,317
Claims priority, application Switzerland, Sept. 7, 1964, 11,667/64
4 Claims. (Cl. 260—240)

ABSTRACT OF THE DISCLOSURE 5-cinnamoylamino-1:9-isothiazoleanthrones of formula

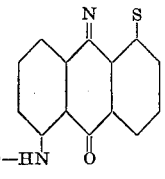

in which X is a hydrogen or halogen atom, an alkyl-, alkoxy- or nitro- group, and $n$ is an integer having a value of 1 to 3 are valuable dyestuffs particularly adapted for coloring polyester fibers.

---

This invention is based on the observation that valuable 5-cinnamoylamino-1:9-isothiazoleanthrones of formula

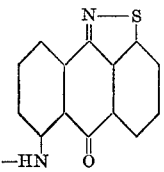

in which A is an aryl residue, particularly a benzene radical, can be obtained when a 5-amino-1:9-isothiazoleanthrone is acylated with a reagent which forms the acyl group of a carboxylic acid of formula $$A-CH=CH-COOH$$

The acylating reagents used are preferably the halides, and particularly the chlorides, of carboxylic acids of formula

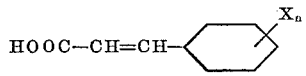

in which X is a hydrogen or halogen atom, an alkyl-, alkoxy- or nitro- group and $n$ is an integer having the value of 1 to 3. The following carboxylic acids are given as examples: cinnamic acid, 2-chlorocinnamic acid, 4-chlorocinnamic acid, 2-bromocinnamic acid, 4-bromocinnamic acid, 2:4-dichlorocinnamic acid, 3:4-dichlorocinnamic acid, 4-methylcinnamic acid, 3:4-dimethylcinnamic acid, 4-isopropylcinnamic acid, 2-trifluoromethylcinnamic acid, 2-methoxycinnamic acid, 4-methoxycinnamic acid, 3:4-dimethoxycinnamic acid and 3-nitrocinnamic acid.

At least 1 mol of the acylating agent, preferably an excess, is used per mol of 5-amino-1:9-isothiazoleanthrone. The acylation can be carried out by known methods, for example in an inert organic solvent e.g. nitrobenzene, chlorobenzene, dimethylformamide or N-methylpyrrolidone, if desired with the addition of an acid-binding substance e.g. pyridine.

The dyestuffs obtained are advantageously worked up by diluting the reaction solution with a low molecular weight alcohol, which precipitates the dyestuff so that it can be filtered, or by evaporation of the solvent, for example by direct distillation or by steam distillation.

The new cinnamoylamino-isothiazoleanthrones are valuable dyestuffs which have excellent affinity for polyester fibres, particularly polyethylene terephthalate fibres, and which dye these in yellow shades having excellent fastness to light and sublimation.

When compared with the 5-benzoylamino-1:9-isothiazoleanthrones described in French Patent 1,277,960, granted Oct. 23, 1961, to Ciba Societe Anonyme, Basel, Switzerland, the dyestuffs obtained according to the invention are distinguished by appreciably greater affinity for polyester fibres. Furthermore, mixtures of 5-cinnamoylamino-isothiazoleanthrones with 5-benzoylamino-isothiazoleanthrones have increased affinity.

For dyeing purposes the new dyestuffs are advantageously used in a finely divided form; dyeing is carried out with the addition of dispersing agents such as soap, sulfite cellulose waste lye or synthetic detergents, or a combination of different wetting and dispersing agents. It is generally desirable to convert the dyestuff, prior to dyeing, into a dyestuff preparation containing a dispersing agent together with the finely divided dyestuff in such a form that a fine dispersion results when the dyestuff preparation is diluted with water. Such dyestuff preparations may be obtained in known manner, e.g. by reprecipitation of the dyestuff from sulfuric acid and grinding of the sludge so obtained with sulfite waste lye, and if necessary by grinding the dyestuff in high efficiency grinding equipment, in a dry or wet form, with or without the addition of dispersing agents in the grinding process.

Owing to their fastness to alkalis the new dyestuffs are particularly suited for dyeing by the so-called thermofixing process, in which the material to be dyed is impregnated with an aqueous dispersion of the dyestuff, preferably containing 1 to 50% of urea and a thickening agent, particularly sodium alginate, preferably at temperatures of not more than 60° C., and squeezed in the usual manner. Preferably the impregnated goods are squeezed so that they retain an amount of dyeing liquid equivalent to 50 to 100% of their initial weight.

In order to fix the dyestuff the material impregnated in this manner is heated, e.g. in a current of warm air, to temperatures of above 100° C., for example between 180 and 220° C., preferably after preliminary drying.

The thermofixing process just described is of particular interest in the dyeing of mixed fabrics of polyester fibres and cellulose fibres, particularly cotton. In that case the padding liquid contains, in addition to the dyestuffs of the invention, dyestuffs suitable for the dyeing of cotton, particularly vat dyestuffs or reactive dyestuffs, i.e. dyestuffs which can be fixed to the cellulose fibre with the formation of a chemical bond, for example dyestuffs containing a chlorotriazine or chlorodiazine group. In the latter case it has proved advantageous to add in acid-binding agent, for example an alkali carbonate, alkali phosphate, alkali borate or alkali perborate, or mixtures of these, to the padding solution. When vat dyestuffs are used it is necessary to treat the pad-dyed fabric, after the heat treatment, with an aqueous alkaline solution of a reducing agent of the type used in vat dyeing.

The dyeings obtained are preferably after-treated, for example by heating with an aqueous solution of a nonionic detergent.

The dyestuffs may also be applied by printing instead of impregenation. For this purpose for example a printing paste is used which in addition to the normal printing additives, such as wetting and thickening agents, contains the finely dispersed dyestuff, mixed if desired with one of the cotton dyestuffs mentioned above, optionally in the presence of urea and/or an acid-binding agent.

In the following example the parts and percentages are by weight unless otherwise stated.

Example 25.2 parts of 5-amino-1:9-isothiazoleanthrone and 25 parts of cinnamoyl chloride were heated in 100 parts of nitrobenzene to 130–135° C. for approximately 5 hours with stirring. After cooling, the reaction mixture was filtered and the filter cake washed first with nitrobenzene and then with alcohol.

The dyestuff obtained of formula

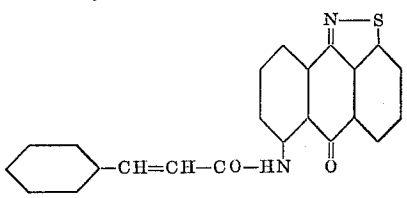

dyed polyester fibres from an aqueous dispersion to give strong yellow shades having very good fastness to light and sublimation.

When compared with the known 5-benzoylamino-1:9-isothiazoleanthrone, the 5-cinnamoylamino-1:9-isothiazoleanthrone was distinguished by greater affinity for polyester fibres.

When a mixture was used which contained equal parts of 5-cinnamoylamino-1:9-isothiazoleanthrone and 5-benzoylamino-1:9-isothiazoleanthrone, the dyeing obtained was at least twice as intense as that obtainable with 5-benzoylamino-isothiazoleanthrone.

Dyeing instructions 1 part of 5-cinnamoylamino-1:9-isothiazoltanthrone was ground wet with 2 parts of a 50% aqueous solution of sulfite cellulose waste lye and dried.

This dyestuff preparation was stirred with 40 parts of a 10% aqueous solution of a condensation product of octadecyl alcohol and 20 mols of ethylene oxide, and 4 parts of a 40% acetic acid solution were added. This mixture was diluted with water to give 4,000 parts of a dye bath.

100 parts of cleaned polyester fibre material was placed in this bath at 50° C., the temperature raised to 120–130° C. during half an hour, and dyeing carried out for 1 hour in a closed vessel at this temperature. The fibre material was then thoroughly rinsed. An intense yellow dyeing having excellent fastness to light and sublimation was obtained.

When 5-amino-1:9-isothiazoleanthrone was acylated with the chloride of the cinnamic acid derivative listed in Column I of the following table, 5-cinnamoylamino-isothiazole-anthrones were obtained which dyed polyethylene terephthalate fibres in the shades listed in Column II.

| Number | I<br>Carboxylic acid | II<br>Color shade |
|---|---|---|
| 1 | 4-methylcinnamic acid | Yellow. |
| 2 | 4-methoxycinnamic acid | Do. |
| 3 | 2-chlorocinnamic acid | Do. |
| 4 | 3-nitrocinnamic acid | Do. |

What is claimed is:
1. A 5-cinnamoylamino-1:9-isothiazole anthrone of formula

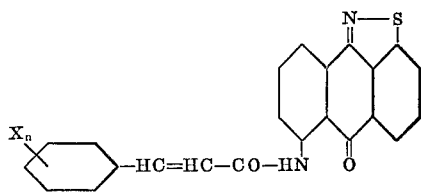

in which X is hydrogen or halogen, alkyl having 1 to 3 carbon atoms, methoxy, trifluoromethyl, or nitro and $n$ is an integer having a value of 1 to 2.

2. The dyestuff of the formula

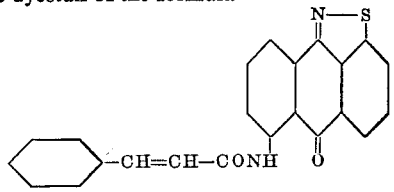

3. The dyestuff of the formula

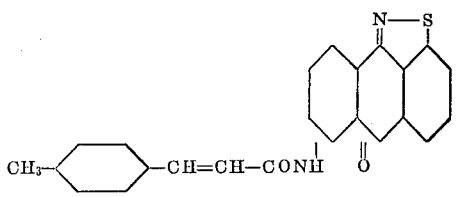

4. The dyestuff of the formula

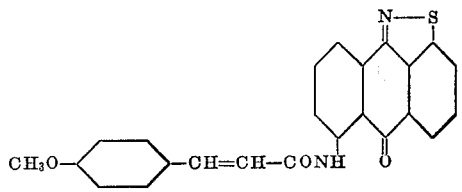

References Cited

UNITED STATES PATENTS 3,100,132  8/1963  Jenny et al. _____ 260—303

HENRY R. JILES, Primary Examiner.

H. I. MOATZ, Assistant Examiner.

UNITED STATES PATENT OFFICE
CERTIFICATE OF CORRECTION

Patent No. 3,412,088                                                   November 19, 19

Visvanathan Ramanathan

It is certified that error appears in the above identified patent and that said Letters Patent are hereby corrected as shown below:

Column 4, lines 9 to 12, that portion of the formula reading "HC=HC-CO-H should read -- HC=CH-CO-HN --; same column 4, lines 29 to 37, the formula should appear as shown below:

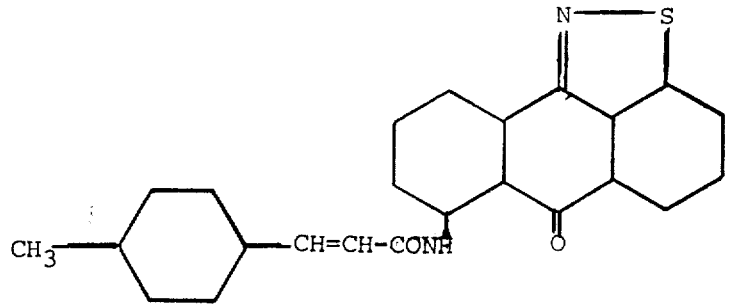

Signed and sealed this 24th day of March 1970.

(SEAL)
Attest:

EDWARD M.FLETCHER,JR.                                          WILLIAM E. SCHUYLER,
Attesting Officer                                                         Commissioner of Pate